United States Patent
Burmeister et al.

(10) Patent No.: US 6,822,048 B1
(45) Date of Patent: Nov. 23, 2004

(54) USE OF ISOCYANATES IN THE PREPARATION OF HIGHLY VISCOUS SELF-ADHESIVE COMPOSITIONS

(75) Inventors: Axel Burmeister, Hamburg (DE); Sven Hansen, Hamburg (DE); Heiko Leydecker, Neustadt (DE); Christian Kreft, Hamburg (DE); Jochen Stähr, Hannover (DE)

(73) Assignee: tesa Aktiengesellschaft, Hamburg (DE)

( * ) Notice: Subject to any disclaimer, the term of this patent is extended or adjusted under 35 U.S.C. 154(b) by 287 days.

(21) Appl. No.: 09/636,781

(22) Filed: Aug. 11, 2000

(30) Foreign Application Priority Data

Aug. 18, 1999 (DE) .......................................... 199 39 078

(51) Int. Cl.⁷ ................................................. C08L 8/30
(52) U.S. Cl. ....................... 525/125; 525/123; 525/452; 428/355 R; 428/355 BL; 428/355 N
(58) Field of Search ................. 525/123, 125; 524/196

(56) References Cited

U.S. PATENT DOCUMENTS

| | | | |
|---|---|---|---|
| 3,692,720 A | * 9/1972 | Sloan .......................... 527/600 |
| 3,860,673 A | * 1/1975 | Lawrence ................ 260/859 R |
| 3,932,558 A | * 1/1976 | Kest et al. ................... 260/841 |
| 3,956,223 A | * 5/1976 | Chiang et al. ........ 260/33.6 AQ |
| 4,021,391 A | * 5/1977 | Ijichi et al. .............. 260/27 BB |
| 4,163,764 A | * 8/1979 | Nash .............................. 525/2 |
| 4,204,046 A | * 5/1980 | Minatono et al. .............. 525/65 |
| 4,603,164 A | * 7/1986 | Chmiel et al. ............... 524/432 |
| 4,851,462 A | * 7/1989 | Chmiel et al. ............... 524/290 |
| 5,204,409 A | * 4/1993 | Arend et al. ................. 525/123 |
| 5,539,033 A | 7/1996 | Bredahl et al. .............. 525/270 |
| 5,550,175 A | 8/1996 | Bredahl et al. .............. 523/348 |
| 5,717,031 A | * 2/1998 | Degen et al. ................ 525/129 |
| 5,760,135 A | * 6/1998 | Korpman et al. .............. 525/95 |
| 5,888,650 A | * 3/1999 | Calhoun et al. ............. 428/354 |
| 5,977,283 A | * 11/1999 | Rossitto ........................ 528/44 |

FOREIGN PATENT DOCUMENTS

| | | | |
|---|---|---|---|
| DE | 19 35 684 A | 2/1971 | |
| EP | 0 668 819 B1 | 8/1995 | |
| EP | 0 751 980 B1 | 1/1997 | |
| JP | 58-7471 A | * 1/1983 | .............. C09J/3/16 |
| WO | WO 94/11175 | 5/1994 | |
| WO | WO 95/25774 | 9/1995 | |
| WO | WO 97/07963 | 3/1997 | |

OTHER PUBLICATIONS

Patent Abstracts of Japan, Publication No. 07278509 A, Date of Publication Oct. 24, 1995, Date of Filing Apr. 5, 1994, Applicant Sekisui Chem Co Ltd., Inventor Terachi Shinji.
Patent Abstracts of Japan, Publication No. 0733197 A, Date of Publication Dec. 19, 1995, Date of Filing Jun. 9, 1994, Applicant Sekisui Chem Co Ltd, Inventor Terachi Shinji.
Database WPI Section Ch, Week 199011 Derwent Publications Ltd., London, GB; Class A18, AN 1990–080389 XP002152949.

* cited by examiner

Primary Examiner—David W. Wu
Assistant Examiner—Rip Lee
(74) Attorney, Agent, or Firm—Norris McLaughlin & Marcus PA

(57) ABSTRACT

Hot-melt pressure-sensitive adhesive based one or more non-thermoplastic elastomers, at least comprising 100 parts by mass of the non-thermoplastic elastomer(s), from 1 to 200 parts by mass of one or more tackifying resins, and also one or more polyfunctional isocyanates which are free from blocking agent, the hot-melt pressure-sensitive adhesive comprising from 8 mmol to 5 mol of the reactive isocyanate groups of the isocyanate per kilogram of the non-thermoplastic elastomer(s) used.

11 Claims, No Drawings ns and to the application of these hot-melt PSAs to produce self-adhesive articles, especially for producing high-performance self-adhesive articles such as tapes or labels.

USE OF ISOCYANATES IN THE PREPARATION OF HIGHLY VISCOUS SELF-ADHESIVE COMPOSITIONS

The present invention relates to the use of isocyanates for the chemical/thermal crosslinking of hot-melt pressure-sensitive adhesives (PSAS) based on non-thermoplastic elastomers, such as natural rubber, for example, using tackifying resins, optionally fillers and plasticizers, and to the application of these hot-melt PSAs to produce self-adhesive articles, especially for producing high-performance self-adhesive articles such as tapes or labels.

The hot-melt PSAs developed in recent years on the polymer basis of non-thermoplastic elastomers, such as, for example, natural rubber or other high molecular mass rubbers, in the absence of a crosslinking step after application lack sufficient cohesion for the majority of applications. This is manifested in inadequate shear strength of the self-adhesive tapes manufactured in this way and may even lead to the formation of disruptive residues of adhesive, which make it impossible to achieve a desired residueless redetachability after use.

For many years, this deficiency prevented the use of hot-melt PSAs based on natural rubber in the self-adhesive tape applications traditionally dominated heavily by natural rubber, such as masking tapes or adhesive tapes for packaging.

The crosslinking processes used to date for hot-melt PSAs based on non-thermoplastic elastomers, by means of ionizing radiation (electron beams=EBC or ultraviolet light=UV), require the presence of appropriate, cost-intensive installations such as radiation sources and complex protective equipment, especially at relatively high film thicknesses.

Furthermore, in the case of many customary ingredients such as fillers, non-transparent resins and pigments, and in the case of thick films of adhesive, UV crosslinking is possible only to an extremely limited extent.

The use of exclusively non-thermoplastic rubbers as an elastomer component in the formulation of PSAs with the existing cost advantage possessed, for example, by natural rubbers over the standard commercial block copolymers, and the outstanding properties, especially the shear strength of natural rubber and of corresponding synthetic rubbers, and also processes for preparing, applying and crosslinking hot-melt PSAs based on non-thermoplastic elastomers, are also set out at length in the patents WO 9411175 A1, WO 9525774 A1, WO 9707963 A1 and, correspondingly, U.S. Pat. No. 5,539,033, U.S. Pat. No. 5,550,175, and also EP 0 751 980 B1 and EP 0 668 819 B1.

In these cases, the additives customary in PSA technology, such as tackifier resins, plasticizers and fillers, are described.

The preparation process disclosed in each case is based on a twin-screw extruder which permits compounding to a homogeneous PSA blend with the chosen process regime, involving mastication of the rubber and subsequent gradual addition of the individual additives with an appropriate temperature regime.

The mastication step of the rubber, which precedes the actual production process, is described at length. It is necessary and characteristic of the process chosen, since with the technology selected therein it is indispensable to the subsequent integration of the other components and to the extrudability of the blended composition. Also described is the feeding-in of atmospheric oxygen, as recommended by R. Brzoskowski, J. L. and B. Kaivani in Kunststoffe 80 (8), (1990), p. 922 ff., in order to accelerate mastication of the rubber.

This procedure makes it absolutely necessary to practise the subsequent step of electron beam crosslinking (EBC), and to use reactive substances as EBC promoters in order to achieve an effective crosslinking yield.

Both process steps are described in the abovementioned patents, but the EBC promoters chosen also tend towards unwanted chemical crosslinking reactions at elevated temperatures, which limits the use of certain tackifying resins.

Owing to the unavoidable high product temperatures, compounding in a twin-screw extruder prevents the use of heat-activatable substances suitable for crosslinking the adhesive compositions, such as, for example, reactive (optionally halogenated) phenolic resins, sulphur or sulphur-donor crosslinker systems, since the chemical crosslinking reactions which ensue in the process result in such a great increase in viscosity that the coatability of the resulting pressure-sensitive adhesive composition is impaired.

The patent application JP 95 278 509 discloses a self-adhesive tape in whose production natural rubber is masticated to an average molecular weight $M_w$=100,000 to 500,000 in order to obtain a coatable homogeneous mixture comprising hydrocarbon resins, rosin/rosin-derivative resins or terpene resins, which can be processed regularly at between 140° C. and 200° C. with a coating viscosity of from 10 to 50×10$^3$ cps, but subsequently requires an extremely high EBC dose (40 Mrad) in order to ensure the shear strength necessary for its use.

For backing materials such as impregnated and/or sized papers, and for woven backings based on viscose staple and the like, the system is not very suitable, since at the necessarily high beam doses there is significant deterioration of the backing.

A disadvantage of the crosslinking technologies (essentially EBC irradiation) described in the documents cited, in addition to the capital investment required, is the damage of certain sensitive backings by electron beams. This is manifested to a particular extent in the case of paper backings, viscose staple wovens, and siliconized release papers, but especially in the case of widespread film materials such as polypropylene, by a deterioration in the elongation-at-break properties.

Moreover, many standard commercial PVC films tend to discolour under EBC irradiation, such discoloration having a deleterious effect in the case of light-coloured or transparent film grades.

Furthermore, many of the release coatings which are customary in adhesive tape manufacture are damaged by electron beam irradiation and so are impaired in their effect. In an extreme case, this may result in the non-unrollability of adhesive tape rolls or in the non-reusability of transfer release papers, which are required in the adhesive tape production process.

Certain synthetic rubbers such as polyisobutylene (PIB), butyl rubber (IIR) and halogenated butyl rubber (XIIR), finally, are not amenable to electron crosslinking and are degraded under irradiation.

One way of minimizing these disadvantages consists in the use of certain substances which lessen the required beam dose and thus the concomitant damage. A range of such substances are known for use as EBC promoters. However, EBC promoters may also tend towards unwanted chemical crosslinking reactions at elevated temperatures, which limits the selection of the EBC promoters that can be used for hot-melt PSA production and, moreover, restricts the use of certain tackifying resins. These restrictions, and certain advantageous combinations of EBC promoters and noncrosslinking phenolic tackifier resins, are the subject-matter, in particular, of the document WO 97/07963.

The use of non-thermoplastic elastomers is also described in JP 95 331 197, where use is made of natural rubber having an average molecular weight (weight average) $M_w$<1 million g/mol with aliphatic, non-reactive hydrocarbon resins, which is blended with blocked isocyanates, precrosslinked at 150° C. for five minutes, and, following its subsequent coating onto PET film, is cured at 180° C. for several minutes (for example 15 minutes).

A disadvantage of this process, firstly, is the blocking agent released during the crosslinking reaction, which on the one hand, if it remains in the adhesive composition, may impair the adhesion properties of the tape in a variety of respects, and on the other hand, on its escape in vapour form, leads to coating defects such as porosities and necessitates complex technology in order to draw off these blocking agents under suction and remove them.

Of particular disadvantage, however, is the high crosslinking temperature, which rules out temperature-sensitive backings such as many films and foams on principle and in the case of paper backings and release papers may lead to embrittlement.

In summary it may be stated that crosslinking of the known hot-melt pressure-sensitive adhesives based on non-thermoplastic elastomers necessitates either damagingly high radiation doses or else damagingly high temperatures with long crosslinking times, and both have the consequence of damage in the case of a large number of the customary backing materials.

The object of the invention is to remedy this situation and to combine the economic advantages of the solvent-free manufacture and application of hot-melt pressure-sensitive adhesives based on non-thermoplastic elastomers with the chemical-thermal crosslinking possibilities of the conventional solvent technology for thick adhesive compositions, including filled and coloured adhesive compositions, with high film thicknesses on radiation- and temperature-sensitive backing materials.

This object is achieved by means of a hot-melt pressure-sensitive adhesive as characterized more closely in the main claim. The subsidiary claims relate to advantageous developments of the subject-matter of the invention, to advantageous possibilities for use, and to processes for producing the backing materials coated with the subject-matter of the invention.

The invention accordingly provides a hot-melt pressure-sensitive adhesive (PSA) based on one or more non-thermoplastic elastomers which comprises:

100 parts by mass of the non-thermoplastic elastomer(s),
  from 1 to 200 parts by mass of one or more tackifying resins and also one or more polyfunctional isocyanates which are free from blocking agent, the hot-melt PSA comprising from 8 mmol to 5 mol of the reactive isocyanate groups of the isocyanate per kilogram of the non-thermoplastic elastomer(s) used.

Preferably, the elastomer or elastomer mixture has an average molar mass of from 300,000 to $1.5*10^6$ g/mol, determined as the weight average using a GPC measurement. In the GPC measurement (gel permeation chromatography, a liquid chromatography conducted in the form of a column chromatography) a liquid phase comprising the dissolved polymer is passed through a gel. Smaller molecules of the dissolved substance are able to penetrate (diffuse) into all the pores; to them, the entire volume of the mobile phase in the separating column is available. For this reason, they are retained longer in the column than are the larger molecules. These molecules, which are larger than the largest pores of the swollen gel, are unable to penetrate the gel particles and migrate past them; they leave the column first. Consequently, in the eluate, the molecules appear in the order of decreasing molecular size. Since the molecular size is generally proportional to the molar mass, gel chromatography offers the possibility of separating and purifying substances of different molar masses and of determining molar masses.

With further preference, the hot-melt PSA in the uncrosslinked state has a complex viscosity of from 10,000 to 300,000 Pa*s at 0.1 rad/s and 110° C., preferably from 30,000 to 170,000 Pa*s at 0.1 rad/s and 110 C, very particularly from 40,000 to 140,000 Pa*s at 0.1 rad/s and 110° C.

The non-thermoplastic elastomers are advantageously selected from the following group, either individually or in any desired mixture:

natural rubbers
  random-copolymerized styrene-butadiene rubbers (SBR)
  butadiene rubbers (BR)
  synthetic polyisoprenes (IR)
  butyl rubbers (IIR)
  halogenated butyl rubbers (XIIR)
  ethylene-vinyl acetate copolymers (EVA)
  polyurethanes.

In a further advantageous development of the invention, the hot-melt PSA comprises a polymer blend of one or more of the non-thermoplastic elastomers and one or more thermoplastic elastomers, the latter again being selectable from the subsequent listing, individually or in any desired mixture:

polypropylenes
  polyethylenes
  metallocene-catalysed polyolefins
  polyesters
  polystyrenes
  synthetic block copolymer rubbers As reactive non-blocked isocyanates it is possible to use both aliphatic and aromatic isocyanates that are free from blocking agent, it also being possible for the blocking-agent-free isocyanate to comprise a mixture of different isocyanates which are distinguished by different reactivities.

Isocyanates which may be used include the following, in a list which should not be understood as being conclusive:

toluene diisocyanate (TDI)
  diphenylmethane diisocyanate (MDI)
  hexamethylene diisocyanate (HDI)
  isophorone diisocyanate (IPDI)
  bis(4-isocyanatocyclohexyl)methane (PICM/$H_{12}$*MDI)

By way of example, mention may also be made of the following:

Additive TI, Bayer AG (toluenesulphonyl-NCO)
  Desmodur CD, Bayer AG
  Vestanat IPDI, Hüls AG (isophoronedi-NCO)
  Vestanat T 1890/100, Hüls AG (poly-NCO)
  TMI, Cytec Industries B.V
  Voranate M 220, Dow Chemical Europe (diphenylmethane diisocyanate)
  Desmodur RFE, Bayer AG
  TMXDI (meta), Cytec Industries B.V (TMXDI)
  Desmodur TT, Bayer AG (TDI)

The crosslinking reaction may take place in the usual manner on the open belt in tunnel installations with an appropriate temperature regime.

For the crosslinking of the hot-melt PSAs it is also possible to utilize the heat treatment processes which are often used in adhesive tape production and are as required, for example, for the relaxation of film materials, or crosslinking may be effected at room temperature on the belt. In one particularly advantageous embodiment, the crosslinking is controlled not only by means of temperature and residence time but also by the addition of catalysts, as are known for PU chemistry and are described, inter alia, in "Catalysis in aliphatic isocyanate alcohol reactions" ["Modern paint coating" Vol. 77 1987 No. 6 page 28–32 and p. 35].

In all cases, there is an absence of damage to the backing by high radiation doses or by high crosslinking temperatures, and of defects in the application pattern or function of the hot-melt PSAs crosslinked in this way.

In order to induce an acceleration in the crosslinking, the said blocking-agent-free isocyanate of the hot-melt PSA may be admixed with a catalyst, such as dibutyltin laurate, for example.

In principle, a large number of further catalysts are suitable. The following table represents one possible selection of catalysts, and should not be regarded as being conclusive. Rather, the person skilled in the art will be confronted with no difficulties whatsoever in using substances other than those explicitly mentioned here.

TABLE

Overview of the catalysts for use stannous octoate
dibutyltin dilaurate (OBTDL)
manganese octoate
zirconium octoate
cobalt octoate
lead octoate
bismuth stannate
lead stannate
zinc octoate
dibutyltin bis-O-phenylphenate
dibutyltin S,S-dibutyldithiocarbonate
triphenylantimony dichloride
dibutyltin maleate
stannous oxalate
stannous stearate
barium nitrate
cadmium octoate
dibutyltin diacetate
dibutyltin dilaurylthiolate
diaza[2.2.2]bicyclooctane (DABCO catalyst)
DBTDL and DABCO catalyst 1:1
bismuth stearate
lead stearate
dimethlyltin dichloride (DMTDC)
stannous naphthenate Octoates (a non-systematic designation for the octanoates (octanates, caprylates)) are the esters and salts of octanoic acid. In the art, however, the term octoate is understood generally to refer to the metal salts of 2-ethylhexanoic acid. The octoates used as metal soaps and driers are low in odour, easier to control than, for example, the naphthenates, and also accelerate drying in a humid atmosphere. Siccatives used are, for example, Ca, Zn, Mn, Co and Pb octoates. Ba octoate is a stabilizer for PVC. Li, Mg, Ca and Al octoates are used to produce mineral oil lubricants. Al octoate is also suitable for gelling light hydrocarbons for cosmetics. Ni octoate and Cu octoate are recommended as oil-soluble fungicides, Ca octoate as a reference substance in atomic absorption spectroscopy, Fe octoate as a combustion catalyst for liquid fuels, Na and K octoates in the preparation of water-soluble penicillins (source: Römpp Lexikon Chemie-Version 1.5, Stuttgart/New York: Georg Thieme Verlag 1998).

To the hot-melt PSA it is possible to add fillers, which may in particular be selected from the group consisting of metal oxides, chalks, with particular preference chalks having specific surface areas of from 3 to 20 $m^2/g$, precipitated or pyrogenic silicas, with particular preference silicas having specific surface areas of from 20 to 250 $m^2/g$, preferably from 40 to 200 $m^2/g$, solid or hollow glass beads, with particular preference the solid or hollow glass beads having an average diameter of from 3 to 200 $\mu$m, preferably from 5 to 135 $\mu$m, microballoons, carbon blacks, with particular preference carbon blacks having specific surface areas of from 20 to 120 $m^2/g$, and/or glass fibres or polymer fibres.

It is also possible for the surface-modified variants of the fillers recited above to find application.

The microballoons are elastic, thermoplastic hollow beads which have a polymer shell. These beads are filled with low-boiling liquids or with liquefied gas. Suitable shell polymers are, in particular, acrylonitrile, PVDC, PVC or acrylates. Hydrocarbons such as the lower alkanes, pentane, for example, are suitable as the low-boiling liquid, while a suitable liquefied gas is a chemical such as isobutane.

Particularly advantageous properties are manifested when the microballoons have a diameter at 25° C. of from 3 $\mu$m to 40 $\mu$m, in particular from 5 $\mu$m to 20 $\mu$m.

By exposure to heat, the capsules expand irreversibly and three-dimensionally. Expansion comes to an end when the internal pressure is equal to the external pressure. In this way, a closed-cell foam backing is obtained which features good flow behaviour and high recovery forces.

Following thermal expansion due to elevated temperature, the microballoons advantageously have a diameter of from 20 $\mu$m to 200 $\mu$m, in particular from 40 $\mu$m to 100 $\mu$m.

This expansion may take place prior to or following the incorporation into the polymer matrix, or else before or after incorporation into the polymer matrix and shaping.

It is also possible to perform the expansion following incorporation into the polymer matrix and prior to shaping.

The fillers should be added individually or in any desired combination in proportions of from 1 to 100 per 100 parts of elastomer.

The fillers should be added individually or in any desired combination in proportions of from 1 to 300 per 100 parts of elastomer.

It is further advantageous to admix plasticizers into the hot-melt PSA, the said plasticizers in turn being selected in particular from the group consisting of paraffinic or naphthenic oils, with particular preference paraffinic or naphthenic oils having kinematic viscosities at 20° C. of between 40 and 255 $mm^2/s$, oligomeric nitrile rubbers, with particular preference liquid nitrile rubbers having ACN contents of from 20 to 40% by weight, in particular from 20 to 35% by weight, liquid isoprene rubbers, with particular preference isoprene rubbers having molar masses of between 10,000 and 70,000 g/mol, oligobutadienes, with particular preference oligobutadienes or functionalized oligobutadienes having molar masses of from 1500 to 70,000 g/mol, soft resins, with particular preference soft resins having molar masses of from 100 to 2000 g/mol, in particular from 250 to 1700 g/mol, wool fats and/or rapeseed oils and castor oils.

The hot-melt PSA of the invention may find application in the production of a self-adhesive article by application of the said adhesive to at least one side of a web-form material, for example a material coated anti-adhesively on both sides, the hot-melt PSA being applied with a preferred rate of from 5 to 3000 g/m², with particular preference from 10 to 200 g/m.

The web-form material may in particular comprise a single-sidedly or double-sidedly coated paper backing or a single-sidedly or double-sidedly coated polymer film backing, in which case the application rate may be from 5 to 200 g/m² and in particular from 10 to 100 g/m².

Surprisingly it is possible, relative to the hot-melt PSA compositions crosslinked with the known radiation techniques, to find a significant improvement in the anchoring of the hot-melt PSA compositions, isocyanate-crosslinked in accordance with the invention, to standard commercial unprimed films, especially when the films concerned are comparatively non-polar films such as polypropylene or polyethylene, for example, and when these films have been pretreated chemically by means of standard commercial primers or physically by means of customary flaming techniques or corona treatment.

As backings it is further possible to use wovens or nonwovens of all kinds.

Consolidated nonwoven webs are produced, for example, on stichbonding machines of the "Malifleece" type from the company Malimo and can be obtained, inter alia, from the companies Naue Fasertechnik and Techtex GmbH. A Malifleece is characterized in that a cross-laid web is consolidated by the formation of loops from fibres of the web.

The backing used may also be a web of the Kunit or Multiknit type. A Kunit web is characterized in that it originates from the processing of a longitudinally oriented fibre web to form a sheetlike structure which has the heads and legs of loops on one side and, on the other, loop feet or pile fibre folds, but possesses neither filaments nor prefabricated sheet-structures. A web of this kind has also been produced for many years, for example, on stitchbonding machines of the "Kunitvlies" type from the company Karl Mayer, formerly Malimo. A further characterizing feature of this web is that, as a longitudinal-fibre web, it is able to absorb high tensile forces in the lengthwise direction. The characteristic feature of a Multiknit web relative to the Kunit is that the web is consolidated on both the top and bottom sides by virtue of the double-sided needle punching.

Finally, stitchbonded webs are also suitable. A stitchbonded web is formed from a nonwoven material having a large number of stitches extending parallel to one another. These stitches are formed by the incorporation, by stitching or knitting, of textile filaments. For this type of web, stitchbonding machines of the type 'Maliwatt' from the company Karl Mayer, formerly Malimo, are known.

Starting materials envisaged for the textile backing are, in particular, polyester fibres, polypropylene fibres or cotton fibres. The present invention, however, is not restricted to the aforementioned materials; rather, a large number of other fibres may be used to produce the web.

Needlepunched, wet-laid and/or air-jet- and/or water-jet-consolidated webs may be obtained, for example, from the company Freudenberg.

Particularly suitable thicknesses which have been found for the hot-melt PSA on the web-form material are between 5 µm and 3000 µm, preferably between 15 µm and 150 µm.

Furthermore, the hot-melt PSA may have been applied to a double-sidedly anti-adhesively coated release paper in a thickness of from 20 µm to 3000 µm, in particular from 40 µm to 1500 µm.

One particularly suitable process for producing the self-adhesive articles set out above, especially for producing high-performance self-adhesive articles such as tapes or labels, is to apply the hot-melt PSA using a multi-roll applicator unit comprising from two to five rolls.

EXAMPLES

The examples which follow are intended to illustrate the use, in accordance with the invention, of isocyanates for the chemical crosslinking of natural-rubber hot-melt pressure-sensitive adhesives, without restricting the invention.

The test methods used are briefly characterized below:

The adhesion tests on the adhesive tape specimens were conducted in each case after a 24 h storage period at room temperature and, for comparison, depending on example, after 7-day thermal conditioning at 70° C. or 40° C., comparability of the results being ensured by the additional storage of the thermally conditioned specimens, prior to the measurements, at 23° C. and 50% atmospheric humidity for 24 h.

Test method 1: Determination of the tensile-stress elongation of films

The test was carried out in accordance with the following standardized methods:

Breaking strength: DIN EN 1940/AFERA 4004

Elongation at break: DIN EN 1941/AFERA 4005

Test method 2: Bond strength

The bond strength (peel strength) of the adhesive tape specimens was determined in accordance with AFERA 4001.

Falling bond strength levels are generally a sign of increasing degree of crosslinking of the hot-melt PSA.

Test method 3: Shear strength

The shear strength of the adhesive tape specimens examined was determined in accordance with PSTC 7 (Holding Power). All values reported were determined at room temperature under the stated load of 20 N with a bond area of 20×13 mm². The results are recorded in minutes of holding time.

An increase in the shear stabilities within the range examined, for a given hot-melt PSA formulation, denotes a higher degree of crosslinking and/or higher cohesion.

In the wider sense it is also necessary to consider the type of failure, in connection with which the following applies:

undercrosslinked (weakly cohesive) hot-melt PSAs:

short shear stability times with cohesive failure optimally crosslinked hot-melt PSAs:

long shear stability time overcrosslinked (too cohesive) hot-melt PSAS:

short shear stability times as a result of adhesive failure

Test method 4: Gel content

The degree of crosslinking of the already applied natural-rubber hot-melt PSA was determined on the finished adhesive tape by way of the gel content of the hot-melt PSA For this purpose, adhesive tape samples in sections of 20 cm² were punched put and these sections were welded into a pouch made from polyethylene spunbonded fabric (commercial Tyvek from the company Du Pont, with a basis weight of approximately 55 g/cm²). The specimens were extracted by shaking with toluene at room temperature for three days. The toluene was changed each day. Following extraction, the toluene was replaced by hexaneiheptane and the samples were dried at 110° C. The gel content was determined by differential weighing, taking into account the extraction losses from the spunbonded fabric and from the backing.

The result is stated as the gel value, in percent, the initially uncrosslinked elastomers being taken as 100%.

Test method 5: Swelling test

In a simplified procedure, it was also possible to determine the degree of crosslinking of the hot-melt PSA on the polymer basis of non-thermoplastic elastomers in a comparative manner, from swelling measurements.

For this purpose, an adhesive tape strip was placed in special boiling-point spirits 60/95 and then examined, visually and mechanically using a spatula, for the presence and consistency of swollen hot-melt PSA gel remaining on the tape.

The result is stated as the 'swelling test' and embraces a scale from 0 to 6.

The ratings on this scale have the following meanings:

| Swelling test rating | Gel consistency in swelling test | Gel content by method 4 [%] |
| --- | --- | --- |
| 0 | Layer of composition is fragmentary and sludgy, i.e. no crosslinking evident | 0 - 5 |
| 1 | Severe swelling, composition very slimy and mobile, i.e. very low crosslinking | 5 - 15 |
| 2 | Severe swelling, composition is slimy and easy to displace | 15 - 25 |
| 3 | Good swelling, composition less slimy and displaceable | 25 - 35 |
| 4 | Slight swelling, composition barely slimy, still displaceable | 35 - 45 |
| 5 | Virtually no swelling, composition almost a coherent layer and virtually impossible to displace | 45 - 55 |
| 6 | No swelling, composition forms a coherent layer and can only be removed by scratching | >55 |

The optimum balance between cohesion and adhesion, expressed by the swelling test 10 rating of the PSA in question, depends on the application of the specific adhesive tape. For general-purpose masking tapes, the optimum swelling test rating, for example, is 2–3; for high-temperature masking tapes with temperature stabilities of greater than 140° C. the optimum swelling test rating is 4–5.

Test method 6: Viscoelastic properties of hot-melt PSAs

Finally, the degree of crosslinking of a given hot-melt PSA may be determined very simply from the measurement of its viscoelastic properties. The evaluation of the results of these measurements requires in each case comparison with the uncrosslinked state of the hot-melt PSA, since the formulation in this case has a very strong influence on the absolute values measured. As a measure of crosslinking it is possible to state both the ratio of the viscosity of the crosslinked composition to the viscosity of the uncrosslinked composition and the corresponding ratio of the loss angles, normally expressed as tan $\delta$.

In order to determine the viscoelastic properties of hot-melt PSAs, dynamic-mechanical measurements were conducted in torsion rheometers, with oscillating deformations being predetermined and resulting shear stresses measured.

In the examples, use was made of an instrument of the type RDA II (Rheometric Dynamic Analyzer II from Rheometric Scientific GmbH, a torsion rheometer with a plate/plate measuring system). A prepared, planar, bubble-free sample of the hot-melt PSA with a film thickness of 1.5 mm was introduced into the measuring system. Measurement was in the temperature range from −50° C. to +200° C. and in a frequency range of from 0.1 rad/s to 100 radis with a constant standard force of 150 g. The measurements were detected with computer assistance; the viscoelastic properties (storage modulus G', loss modulus G", loss angle tan $\delta$, complex viscosity $\eta^*$) of the hot-melt PSA were determined for the stated temperature and frequency ranges in the customary manner from the extent and course of the measured shear stresses over time.

Measurements of this kind can be conducted both on prepared hot-melt PSA samples and on complete adhesive tapes, it being necessary in the latter case to laminate adhesive tape samples to one another until the appropriate film thickness is reached and to fasten the backing side of the topmost layer to the corresponding plate of the measuring system using an appropriate structural adhesive.

Test method 7: Processing viscosity of the hot-melt PSA

In order to obtain rapid information on the viscoelastic properties of a hot-melt PSA, especially the degree of degradation or, respectively, degree of crosslinking of the framework polymer, during production, dynamic-mechanical measurements in accordance with above-described test method 6 were conducted in the frequency range from 0.1 rad/s to 100 rad/s at a constant standard force of 150 g, but with the measurement temperature left constant at 110° C. Prior to measurement, the hot-melt PSA samples were preheated at 110° C. in the measuring system for 7 minutes.

The value of the complex viscosity at a frequency of 0.1 rad/s and a temperature of 110° C. gives information, for identical formulation and identical molar masses of the elastomer, on the cohesiveness and, respectively, degree of crosslinking of the self-adhesive composition.

To quantify the degree of crosslinking:

The crosslinking number, CN, is introduced as the ratio of the respective complex viscosity of the crosslinked hot-melt PSA formulation to the complex viscosity of the uncrosslinked hot-melt PSA formulation:

CN Viscosity of the crosslinked hot-melt PSA/viscosity of the uncrosslinked hot-melt PSA.

Test method 8: Molar mass determination by means of gel permeation chromatography The molar masses of the elastomer fraction present in the natural-rubber hot-melt PSAs were determined exclusively on uncrosslinked hot-melt PSA samples by means of GPC on polystyrene standard with the following measurement system:

| | |
| --- | --- |
| Eluent: | tetrahydrofuran (THF), analytical grade |
| Columns: | PSS-SDV, 5 µm 103 Å, ID 8.0 mm × 300 mm |
| | PSS-SDV, 5 µm 105 Å, ID 8.0 mm × 300 mm |
| Precolumn: | PSS-SDV, 5 µm 106 Å, ID 8.0 mm × 300 mm |
| Pump: | TSP P200 |
| Flow rate: | 1.0 ml/min |
| Injection system: | TSP AS30000 with 100 ml injection volume |
| Temperature: | 25° C. |
| Detectors: | TSP UV 2000 UV/VIS detector at 254 nm |
| | Shodex differential refractometer RI 71 |
| Evaluation: | PSS-WinGPC Version 4.02 |

Example 1

Damage to a BOPP film by electron beam irradiation

A biaxially oriented polypropylene film (35 µm BOPP film from Pao Yan, Taipei) with a standard primer, coated with 20 µm of a self-adhesive composition based on natural rubber, for use as an adhesive packaging tape, was subjected to an electron beam dose of 5 kGy with an acceleration voltage of 150 kV and subsequently stored in strip form centrally under a UV lamp (OSRAM ULTRAVITALUX® with 300-watt output) mounted at a height of 50 cm.

A non-irradiated adhesive tape sample was subjected to the same UV storage. Following UV storage, the tensile-stress elongation parameters, namely the breaking strength and the maximum elongation at break, of the BOPP films were determined in accordance with test method 1.

After 20 h of UV exposure, the tensile-stress elongation parameters of the irradiated BOPP films in comparison to the non-irradiated BOPP film fell, even with the extremely low chosen EBC dose of 5 kGy, by 32% for the breaking strength and by 31% for the maximum elongation at break. This degree of damage is intolerable for adhesive packaging tapes.

It follows from this that the EBC technology is unsuitable for improving the performance of BOPP adhesive packaging tapes owing to the damage which occurs to the polypropylene films.

Example 2

In Examples 2 to 4, natural-rubber hot-melt PSAs with the same overall formulations, A.0 and A, were prepared in one or more stages. Formulation A.0 was a crosslinker-free comparative formulation, A contained crosslinker.

All formulations are specified in phr, i.e. in relation to 100 parts by mass of natural rubber.

The following components were used:

| | |
|---|---|
| Natural rubber | SVR 5L (obtainable from Weber Schaer, Hamburg) |
| Tackifier resin | HERCOTAC 205 (from Hercules BV, Rijswijk, NL) |
| Filler | Mikrosöhl 40 ground chalk (Vereinigte Kreidewerke Dammann KG, Söhlde) |
| Plasticizer | paraffinic white oil, Shell Ondina G 33 (Deutsche Shell AG, Hamburg) |
| Ageing inhibitor | Lowinox ® 22M46, a 2,2-methylene bis [6-(1,1-dimethylethyl)-4-methylphenol)] from GREAT LAKES |
| Isocyanate crosslinker | Diphenylmethane 4,4'-diisocyanate-based product Suprasec DNR with approximately 31% NCO group content (from ICI Polyurethanes, Lohne) |

| | phr |
|---|---|
| Formulation A.0 | |
| Natural rubber, granulated | 100.0 |
| Hercotac 205 | 98.0 |
| Chalk | 18.0 |
| White oil | 4.0 |
| Ageing inhibitor | 2.0 |
| Formulation A | |
| Natural rubber, granulated | 100.0 |
| Hercotac 205 | 98.0 |
| Chalk | 18.0 |
| White oil | 4.0 |
| Ageing inhibitor | 2.0 |
| Suprasec DNR | 0.9 |

The natural rubber was granulated, prior to its use, in a granulator from Pallmann using small amounts of talc as release agent.

The natural-rubber hot-melt PSAs prepared batchwise, as in Examples 1 and 2, or continuously, as in Example 3, were applied, immediately after their preparation, using a flexurally rigid 2-roll applicator unit. The adhesive film was applied directly in a thickness of 20 μm to the primed (using standard technology) side of a 35 μm thick BOPP film (35 μm BOPP film from Pao Yan, Taipei). A coating gap was established between the first and the second, web-carrying coating roll in accordance with the application thickness. The first roll was temperature-controlled at 140° C., the web-carrying roll at from 60 to 80° C. Depending on the particular example, the natural-rubber hot-melt PSA supplied to the roll nip had a temperature of from 70 to 120° C. Coating was carried out at the web speed adapted to the respective preparation process. In the case of continuous preparation of the composition, in Examples 3 and 4, the natural-rubber hot-melt PSA was supplied to the roll nip by means of a belt or conveying extruder.

In a first process step, a prebatch was prepared. The prebatch was prepared in accordance with the formulation designated VB-A in a Banbury kneading device of type GK 1.4 N from Wemer & Pfleiderer, Stuttgart.

| Prebatch formulation VB-A | |
|---|---|
| | Phr |
| Natural rubber, granulated | 100.0 |
| Hercotac 205 | 18.0 |
| Chalk | 18.0 |
| White oil | 4.0 |
| Ageing inhibitor | 2.0 |

The kneading chamber and rotors were temperature-controlled at 250° C. and the blade speed was 50 $min^{-1}$. The overall weight of the prebatch was 1.1 kg. All of the constituents were premixed in dry form and metered in together with the white oil.

A mixing time of 6 minutes was sufficient to homogenize the constituents of the prebatch. In a second process step, the natural-rubber hot-melt PSA was mixed to completion. For this purpose, all further additives were added to the prebatch in a kneading machine of type LUK1.0 K3 from Werner & Pfleiderer, Stuttgart, to give natural-rubber hot-melt PSAs corresponding to the overall formulations A0 and A, respectively. The prebatch was kneaded for ½ minute, then the entire tackifier resin in accordance with formulation F-A.0 and F-A was added. The isocyanate was admixed after 10 minutes, and after 13 minutes the adhesive composition was ready.

| | phr |
|---|---|
| Formulation F-A.0 | |
| Prebatch VB-A | 142 |
| Hercotac 205 | 80 |
| Formulation F-A | |
| Prebatch VB-A | 142 |
| Hercotac 205 | 80 |
| Suprasec DNR | 0.9 |

Formulation F-A.0 corresponds in total to the overall formulation A.0 of the natural-rubber hot-melt PSA; formulation F-A corresponds in total to the overall formulation A of the natural-rubber hot-melt PSA.

The overall weight of the hot-melt PSA was 500 g. The chamber temperature was set at 80° C. throughout the process of mixing to completion. The overall kneading time was 10 minutes.

Example 3

Example 2 was repeated.

To simplify discharge, the second process step, that of mixing to completion, was carried out using a kneading machine of type Vl U 20 L from Aachener Misch-und Knetmaschinen-Fabrik Peter Küpper, Aachen, with a discharge screw. The prebatch was kneaded for ½ minute, then the entire tackifier resin in accordance with formulations F-A.0 and F.A was added. The isocyanate was admixed after 8 minutes, and the mixture was kneaded to completion for a further 4 minutes.

The overall weight of the hot-melt PSA was 12 kg. The chamber temperature was set at 80° C. The overall kneading time was 12 minutes, the discharge time 7 minutes.

Example 4

The natural-rubber hot-melt PSA was prepared using a planetary roll extruder from ENTEX Rust & Mitschke with three roll cylinders. The diameter of the roll cylinders was 70 mm. The first of the approach rings was provided with radial bores through which the liquid was supplied by means of metering pumps. Gravimetric metering units, metering pumps, and the rotary speed of the central spindle were set so as to give a product rate of 65 kg/h with homogeneous mixing. The individual roll cylinders were temperature-controlled so as to give a product temperature of 80° C.

The adhesive tapes obtained in accordance with Examples 2 to 4, coated with a hot-melt PSA of formulation A, all have a bond strength of 3–5 N/cm and shear stability times (20N) of >10,000 minutes and CN values of more than 1.3, and are suitable as adhesive packaging tapes.

For comparison:

The comparison formulation A.0, which was prepared in accordance with Example 2 without the isocyanate and is in principle likewise suitable for use as an adhesive packaging tape, gave comparable bond strengths with shear stability times of only about 100 minutes.

TABLE 1

Adhesion properties of the crosslinker-free formulation A.0

|  | Storage 4 days at room temperature | In accordance with measurement method |
|---|---|---|
| Shear test 20 N or steel [min] | 97 | PSTC 7 |
| Bond strength on steel [N/cm] | 3.8 | AFERA 4001 |
| Gel content | 3.8 | Test method 4 |
| Swelling test | 0 | Test method 5 |
| Complex viscosity at 0.1 rad/s and 110° C. [Pa*s] | 9.07*10$^4$ CN = 1.0 | Test method 7 |

Example 5

A natural-rubber hot-melt PSA formulation B for use as a masking tape was prepared in accordance with the process described in Example 2. In addition to the raw materials already mentioned above, the aliphatic hydrocarbon resin Escorez 1202 from EXXON, titanium dioxide KRONOS 2160 from KRONOS NL CHEMICALS, INC., Hightstown, N.J., and the relatively high molecular mass Airdried Sheet Natural Rubber, obtainable from Weber & Schaer, Hamburg, were used.

The hot-melt PSA was applied by the above-described 2-roll application process, with a film thickness of 40 μm, to a slightly creped paper backing impregnated by industry-standard processes and equipped with a release layer and primer layer.

Formulation B

|  | phr |
|---|---|
| Natural rubber, granulated | 100.0 |
| Hercotac 205 | 61.4 |
| Resin 1202 | 38.6 |
| TiO$_2$ | 2.3 |
| Chalk | 22.7 |
| Ageing inhibitor Lowinox ® 22M46 | 2.3 |

In the first process step in each case, prebatches were prepared in accordance with the process from Example 2 but using the formulation VB-B. As parameters for the experimental series, the prebatch mixing time was varied between 1 and 12 minutes.

Formulation VB-B:

|  | phr |
|---|---|
| Natural rubber, granulated | 100.0 |
| Resin, Hercotac 205 | 18.2 |
| Chalk | 22.7 |
| TiO$_2$ | 2.3 |
| Ageing inhibitor | 2.3 |

In the process step 2 described in Example 2, the remaining resin fraction in accordance with formulation F-B was in each case added to the prebatch in the LUK kneading apparatus and the hot-melt PSA was kneaded to completion for a total of 10 minutes.

Formulation F-B

|  | phr |
|---|---|
| Prebatch VB-A | 145.5 |
| Hercotac 205 | 43.2 |
| Resin 1202 | 38.6 |

The adhesive tapes produced in this example were all suitable for use as masking tape, but for different performance ranges. Depending on the degree of breakdown of the natural rubber over the mixing time of the prebatch, formulation VB-B, in the first process step, it was possible to influence the adhesion properties of the masking tape within a wide range.

Table 2 shows the adhesion data of the masking tape and the complex viscosity obtained from dynamic-mechanical measurements, η*, of the hot-melt PSA prior to coating. As the mixing time in the first process step increases, there is a decrease in the cohesion of the self-adhesive composition, which is evident by decreasing complex viscosity in accordance with test method 7 and by the falling shear test values of the masking tape in accordance with test method 3.

TABLE 2

| Designations | ADS 1 | ADS 1-crosslinked | V1 | V2 | V4 | V12 | V12-crosslinked |
|---|---|---|---|---|---|---|---|
| Natural rubber type | ADS | ADS | SVR 5L | SVR 5L | SVR 5L | SVR 5L | SVR 5L |
| Prebatch mixing time [min] (Process step 1) | 1 | 1 | 1 | 2 | 4 | 12 | 12 |
| Shear test 10N on steel [min] PSTC 7, 10N load | 1506 | >$10^4$ | 645 | 314 | 283 | 140 | 734 |
| Bond strength on steel [N/cm] AFERA 4001 | 2.6 | 2.4 | 2.9 | 3.5 | 3.6 | 3.7 | 3.5 |
| Complex viscosity $\eta^*$ [Pa * s] (Temperature T = 110° C. Frequency f = 0.1 rad/s), Test method 7 | $3.26 * 10^5$ | $6.28 * 10^5$ CN = 1.92 | $1.47 * 10^5$ | $1.16 * 10^5$ | $9.08 * 10^4$ | $5.72 * 10^4$ | $1.25 * 10^5$ CN = 2.37 |
| Molar mass average $M_w$ by GPC, [g/mol] Test method 8 | 1.10 | n.m. | n.m. | n.m. | n.m. | 0.78 | n.m. | n.m.: not measured

The specimens ADS and V 1 to V12 all correspond to the overall formulation B. The self-adhesive compositions ADS 1 and V12 from Table 2 were subsequently postcrosslinked, in accordance with the process from Example 2, with 0.36% of diphenylmethane 4,4'-diisocyanate (Desmodur MC 44/flakes from the manufacturer BAYER AG, Leverkusen) and designated as "ADS-crosslinked" and "V12-crosslinked" respectively. The effect of the isocyanate crosslinking of the hot-melt PSA is evident from the figures.

Examples 6 to 14 demonstrate the effect of the crosslinker and catalyst substances used in accordance with the invention, which were each added to the formulation A.0.

The isocyanates used and the exact formulations are evident from the respective examples. The particular properties achieved in the hot-melt PSAs and self-adhesive tapes prepared and produced are shown in table form.

The crosslinker effect can be read off clearly from the figures for the shear stability times and from the CN values.

Example 6

Isocyanate system used: 99% pure diphenylmethane 4,4'-diisocyanate, MDI-Desmodur MC 44/flakes from the manufacturer Bayer AG, Leverkusen.

| Formulation A.1 | phr |
|---|---|
| Natural rubber, granulated | 100 |
| MDI | 2.2 |
| Hercotac 205 | 98 |
| Chalk Microsöhl 40 | 18 |
| White oil | 4 |
| Lowinox ® 22M46 | 2 |

| Adhesion properties | Storage for 4 days at room temperature | In accordance with measurement |
|---|---|---|
| Shear test 20 N on steel [min] | >10000 | PSTC 7 |
| Bond strength on steel [N/cm] | 3.2 | AFERA 4001 |
| Gel content | 24.1 | Test method 4 |
| Swelling test rating | 2.5 | Test method 5 |
| Complex viscosity $\eta^*$ [Pa*s] (Temperature T = 110° C., Frequency f = 0.1 rad/s) | $1.70*10^5$ CN = 1.9 | Test method 7 |

Example 7

Isocyanate system used: 99% pure diphenylmethane 4,4'-diisocyanate, MDI-Desmodur MC 44/flakes from the manufacturer Bayer AG, Leverkusen.

| Formulation A.2 | phr |
|---|---|
| Natural rubber, granulated | 100 |
| Desmodur MC44 | 11 |
| Hercotac 205 | 98 |
| Chalk, Microsöhl 40 | 18 |
| White oil | 4 |
| Lowinox ® 22M46 | 2 |

| Adhesion properties | Storage for 4 days at room temperature | In accordance with measurement method |
|---|---|---|
| Shear test 20 N on steel [min] | >10000 | PSTC 7 |
| Bond strength on steel [N/cm] | 3.0 | AFERA 4001 |
| Gel content | 31.1 | Test method 4 |
| Swelling test rating | 3.5 | Test method 5 |
| Complex viscosity [Pa*s] (T = 110° C., f = 0.1 rad/s) | $3.97*10^5$ CN = 4.4 | Test method 7 |

Example 8

Isocyanate system used: 99% pure diphenylmethane 4,4'-diisocyanate, MDI-Desmodur MC 44/flakes from the manufacturer Bayer AG, Leverkusen.

In addition, the dibutyltin dilaurate from the manufacturer MERCK/Schuchardt was used as crosslinking accelerator.

| Formulation A.3 | phr |
|---|---|
| Natural rubber, granulated | 100 |
| MDI | 2.21 |
| Dibutyltin laurate | 0.11 |
| Hercotac 205 | 98 |
| Chalk, Microsöhl 40 | 18 |
| White oil | 4 |
| Lowinox ® 22M46 | 2 |

| Adhesion properties | Storage for 4 days at room temperature | In accordance with measurement method |
|---|---|---|
| Shear test 20 N on steel [min] | >10000 | PSTC 7 |
| Bond strength on steel [N/cm] | 3.1 | AFERA 4001 |
| Gel content | 22.5 | Test method 4 |
| Swelling test rating | 2 | Test method 5 |
| Complex viscosity [Pa*s] (T = 110° C., f = 0.1 rad/s) | $1.58*10^5$ CN = 1.7 | Test method 7 |

Example 9

Isocyanate system used: 99% pure diphenylmethane 4,4'-diisocyanate, MDI-Desmodur MC 44/flakes from the manufacturer Bayer AG, Leverkusen.

In addition, the dibutyltin dilaurate (DBTL) from the manufacturer MERCK/Schuchardt was used as crosslinking accelerator.

| Formulation A.4 | phr |
|---|---|
| Natural rubber, granulated | 100 |
| MDI | 11 |
| Dibutyltin laurate | 1.10 |
| Hercotac 205 | 98 |
| Chalk, Microsöhl 40 | 18 |
| White oil | 4 |
| Lowinox ® 22M46 | 2 |

| Adhesion properties | Storage for 4 days at room temperature | In accordance with measurement method |
|---|---|---|
| Shear test 20 N on steel [min] | 1051 | PSTC 7 |
| Bond strength on steel [N/cm] | 1.6 | AFERA 4001 |
| Gel content | 44.1 | Test method 4 |
| Swelling test rating | 4.5 | Test method 5 |
| Complex viscosity [Pa*s] (T = 110° C., f = 0.1 rad/s) | 3.42*10$^5$ CN = 3.8 | Test method 7 |

Example 10

The use of a dimerized isophorone diisocyanate (Vestanat T 1890/100, from HÜLS, Marl).

| Formulation A.5 | phr |
|---|---|
| Natural rubber, granulated | 100 |
| Isophorone diisocyanate | 2.22 |
| Hercotac 205 | 98 |
| Chalk, Microsöhl 40 | 18 |
| White oil | 4 |
| Lowinox ® 22M46 | 2 |

| Adhesion properties | Storage for 4 days at room temperature | In accordance with measurement method |
|---|---|---|
| Shear test 20 N on steel [min] | 1655 | PSTC 7 |
| Bond strength on steel [N/cm] | 3.5 | AFERA 4001 |
| Gel content | 7.8 | Test method 4 |
| Swelling test rating | 1 | Test method 5 |
| Complex viscosity (T = 110° C., f = 0.1 rad/s) | 1.35*10$^5$ CN = 1.5 | Test method 7 |

Example 11

Examples 11 and 12 show the use of a cycloaliphatic sterically hindered isophorone diisocyanate (Vestanat IPDI from Hüls/Marl).

| Formulation A.6 | phr |
|---|---|
| Natural rubber, granulated | 100 |
| Vestanat IPDI | 1.72 |
| Hercotac 205 | 98 |
| Chalk, Microsöhl 40 | 18 |
| White oil | 4 |
| Lowinox ® 22M46 | 2 |

| Adhesion properties | Storage for 4 days at room temperature | In accordance with measurement method |
|---|---|---|
| Shear test 20 N on steel [min] | 143 | PSTC 7 |
| Bond strength on steel [N/cm] | 3.8 | AFERA 4001 |
| Gel content | 7.5 | Test method 4 |
| Swelling test rating | 1 | Test method 5 |
| Complex viscosity (T = 110° C., f = 0.1 rad/s) | 1.32 * 10$^5$ CN = 1.5 | Test method 7 |

Example 12

| Formulation A.7 | phr |
|---|---|
| Natural rubber, granulated | 100 |
| Vestanat IPDI | 35 |
| Hercotac 205 | 98 |
| Chalk, Microsöhl 40 | 18 |
| White oil | 4 |
| Lowinox ® 22M46 | 2 |

| | Storage for 7 days at 70° C. | Test method |
|---|---|---|
| Shear test 20 N on steel [min] | >10000 | PSTC 7 |
| Bond strength on steel | 2.9 | AFERA 4001 |
| Gel content | not measured | Test method 4 |
| Swelling test rating | 6 | Test method 5 |
| Complex viscosity (T = 110° C., f = 0.1 rad/s) | 3.86 * 10$^5$ CN = 4.3 | Test method 7 |

Example 13

An aliphatic isocyanate was used (Desmodur N3200 from the manufacturer Bayer AG, Leverkusen).

| Formulation A.8 | phr |
|---|---|
| Natural rubber, granulated | 100 |
| Desmodur N3200 | 2.9 |
| Hercotac 205 | 98 |
| Chalk, Microsöhl 40 | 18 |
| White oil | 4 |
| Lowinox ® 22M46 | 2 |

| | Storage for 4 days at room temperature | In accordance with measurement method |
|---|---|---|
| Shear test 20 N on steel [min] | 7268 | PSTC 7 |
| Bond strength on steel [N/cm] | 3.1 | AFERA 4001 |
| Gel content | 21.6 | Test method 4 |
| Swelling test rating | 2.5 | Test method 5 |

-continued

| Formulation A.8 | | |
|---|---|---|
| Complex viscosity (T = 110° C., f = 0.1 rad/s) [Pa*s] | 1.20 * 10$^5$ CN = 1.32 | Test method 7 |

Example 14

In this example, two isocyanate systems were used:
Desmodur MC44/flakes, and
Vestanat IPDI (from HÜLS, Marl)

| Formulation A.9 | |
|---|---|
| | phr |
| Natural rubber, granulated | 100 |
| Desmodur MC44 | 1.10 |
| Vestanat IPDI | 11 |
| Resin, Hercotac 205 | 98 |
| Chalk, Microsöhl 40 | 18 |
| White oil | 4 |
| Lowinox ® 22M46 | 2 |

| | Fresh | In accordance with measurement method |
|---|---|---|
| Shear test 20 N on steel [min] | 143 | PSTC 7 |
| Bond strength on steel | 3.3 | AFERA 4001 |
| Gel content | 21.4 | Test method 4 |
| Swelling test rating | 3 | Test method 5 |
| Complex viscosity (T = 110° C., f = 0.1 rad/s) | 1.78 * 10$^5$ CN = 1.8 | Test method 7 |

Example 15

In Examples 15 and 16, synthetic styrene-butadiene rubbers (SBR) were used. In the uncrosslinked base formulation, in Example 15, SBR 1500 from Ameripol Synpol Corporation, Akron, USA, was used. In Example 16, the isocyanate Desmodur MC 44/flakes was used as crosslinker.

| Formulation A.10 | |
|---|---|
| | phr |
| Natural rubber, granulated | 66 |
| SBR 1500 | 34 |
| Hercotac 205 | 98 |
| Chalk, Microsöhl 40 | 18 |
| White oil | 4 |
| Lowinox ® 22M46 | 2 |

| | Storage for 4 days at room temperature | In accordance with measurement method |
|---|---|---|
| Shear test 20 N on steel [min] | 561 | PSTC 7 |
| Bond strength on steel | 3.8 | AFERA 4001 |
| Gel content | 5.6 | Test method 4 |
| Swelling test rating | 0.5 | Test method 5 |
| Complex viscosity at 0.1 rad/s and 110° C. [Pa*s] | 7.79 * 10$^4$ | Test method 7 |

Example 16

In Examples 15 and 16, synthetic styrene-butadiene rubbers (SBR) were used. In the uncrosslinked base formulation, in Example 15, SBR 1500 from Ameripol Synpol Corporation, Akron, USA, was used. In Example 16, the isocyanate Desmodur MC 44/flakes was used as crosslinker.

| Formulation A.11 | |
|---|---|
| | phr |
| Natural rubber, granulated | 66 |
| SBR 1500 | 34 |
| Hercotac 205 | 98 |
| Chalk, Microsöhl 40 | 18 |
| White oil | 4 |
| Lowinox ® 22M46 | 2 |
| Desmodur MC 44 | 1.8 |

| | Storage for 4 days at room temperature | In accordance with measurement method |
|---|---|---|
| Shear test 20 N on steel [min] | 3324 | PSTC 7 |
| Bond strength on steel | 3.2 | AFERA 4001 |
| Swelling test rating | 2 | Test method 3 |
| Gel content | 15.1 | Test method 4 |
| Complex viscosity at 0.1 rad/s and 110° C. [Pa*s] | 1.26 * 10$^5$ CN = 1.4 | Test method 6 |

Hot-melt pressure-sensitive adhesives were found which can be crosslinked in the tunnel at very moderate temperatures which do not damage the backings.

In the most favourable case, the adhesive may be crosslinked during the storage of the adhesive tape bales, in the production process or on the roll.

What is claimed is:

1. Hot-melt pressure-sensitive adhesive based on at least one non-thermoplastic elastomer, the adhesive comprising
    100 parts by mass of the non-thermoplastic elastomer,
    1 to 200 parts by mass of at least one tackifying resin, and
    a mixture of blocking-agent-free isocyanates which comprises of a mixture of different isocyanates which are distinguished by different reactivities,
    the adhesive comprising from 8 mmol to 5 mol of reactive isocyanate groups of this isocyanate per kilogram of the non-thermoplastic elastomer.

2. Hot-melt pressure-sensitive adhesive according to claim 1, wherein the non-thermoplastic elastomer is selected from the group consisting of natural rubbers, random-copolymerized styrene-butadiene rubbers, butadiene rubbers, synthetic polyisoprenes, butyl rubbers, halogenated butyl rubbers, ethylene-vinyl acetate copolymers and polyurethanes.

3. Hot-melt pressure-sensitive adhesive according to claim 1, wherein the adhesive further comprises a polymer blend of at least one non-thermoplastic elastomer and at least one thermoplastic elastomer, wherein said thermoplastic elastomer is selected from the group consisting of polypropylenes, polyethylenes, metallocene-catalysed polyolefins, polyesters, polystyrenes and synthetic block copolymer rubbers.

4. Hot-melt pressure-sensitive adhesive according to claim 1, wherein the crosslinking of the blocking-agent-free isocyanate is accelerated by means of a catalyst.

5. Hot-melt pressure-sensitive adhesive according to claim 1, wherein fillers are added to the adhesive which are selected from the group consisting of metal oxides, chalks, precipitated silicas, pyrogenic silicas, solid glass beads, hollow glass beads, microballoons, carbon blacks, glass fibres and polymer fibres.

6. Hot-melt pressure-sensitive adhesive according to claim 1 wherein plasticizers are added to the adhesive which are selected from the group consisting of paraffinic oils, naphthenic oils, oligomeric nitrile rubbers, liquid isoprene rubbers, oligobutadlenes, soft resins, wool fats, rapeseed oils and castor oils.

7. Self-adhesive article obtained according to claim 1, wherein the hot-melt pressure-sensitive adhesive is applied to at least one side of a web-form material.

8. Self-adhesive article according to claim 7, wherein the thickness of the hot-melt pressure sensitive adhesive on the web-form material is between 5 $\mu$m and 3000 $\mu$m.

9. Self-adhesive article according to claim 8, wherein the hot-melt pressure-sensitive adhesive is applied in a thickness of from 20 $\mu$m to 3000 $\mu$m, to a release paper having an anti-adhesive coating on both sides.

10. The self-adhesive article of claim 8, wherein the thickness of the hot-melt pressure-sensitive adhesive on the web-form material is between 15 $\mu$m and 150 $\mu$m.

11. The self-adhesive article of claim 9, wherein the hot-melt pressure-sensitive adhesive is applied in a thickness of from 40 $\mu$m and 1500 $\mu$m to a release paper having an anti-adhesive coating on both sides.

* * * * *

UNITED STATES PATENT AND TRADEMARK OFFICE
CERTIFICATE OF CORRECTION

PATENT NO. : 6,822,048 B1
DATED : November 23, 2004
INVENTOR(S) : Burmeister et al.

It is certified that error appears in the above-identified patent and that said Letters Patent is hereby corrected as shown below:

Column 1,
Line 3, "(PSAS)" should read -- (PSAs) --.

Column 7,
Line 3, "10 to 200 g/m" should read -- 10 to 200 g/m$^2$ --.

Column 8,
Line 49, "PSAS:" should read -- PSAs: --.
Line 55, "PSA For" should read -- PSA. For --.
Line 63, "hexaneiheptane" should read -- hexane/heptane --.

Column 9,
Line 65, "100 radis" should read -- 100 rad/s --.

Column 10,
Line 50, "AS30000" should read -- AS3000 --.

Column 12,
Line 25, "250°C." should read -- 25°C --.
Line 36, "AO" should read -- A.O --.

UNITED STATES PATENT AND TRADEMARK OFFICE
CERTIFICATE OF CORRECTION

PATENT NO. : 6,822,048 B1
DATED : November 23, 2004
INVENTOR(S) : Burmeister et al.

It is certified that error appears in the above-identified patent and that said Letters Patent is hereby corrected as shown below:

<u>Column 19,</u>
Line 28, "143" should read -- 1233 --.

<u>Column 21,</u>
Line 5, "oligobutadlenes" should read -- oligobutadienes --.

Signed and Sealed this

Twenty-third Day of August, 2005

JON W. DUDAS
*Director of the United States Patent and Trademark Office*